United States Patent
Simon et al.

(10) Patent No.: US 6,194,797 B1
(45) Date of Patent: Feb. 27, 2001

(54) METHOD FOR PRODUCING A MULTIPOLE ELECTRIC MOTOR, AND A MULTIPOLE ELECTRIC MOTOR

(75) Inventors: Ernst-Ulrich Simon, Oberursel; Hans Kolibius, Babenhausen; Stefan Zech, Eltville, all of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/169,191

(22) Filed: Oct. 8, 1998

(30) Foreign Application Priority Data

Oct. 29, 1997 (DE) .............................................. 197 47 664

(51) Int. Cl.[7] .............................. H02K 37/00; H02K 1/12
(52) U.S. Cl. ......................... 310/49 R; 310/42; 310/43; 310/91; 310/254
(58) Field of Search ................................ 310/42, 43, 45, 310/89, 91, 254, 49 R, 83, DIG. 6; 29/596, 597, 598

(56) References Cited

U.S. PATENT DOCUMENTS

| 4,577,129 | * | 3/1986 | Bertram ................................ 310/112 |
| 4,680,494 | * | 7/1987 | Grosjean .............................. 310/156 |
| 4,684,840 | * | 8/1987 | Bertram et al. ....................... 310/162 |
| 4,782,353 | * | 11/1988 | Ogihara et al. ..................... 310/49 R |
| 4,883,996 | * | 11/1989 | Aoki ..................................... 310/154 |
| 5,767,606 | * | 6/1998 | Bresolin ............................... 310/254 |
| 5,825,115 | * | 10/1998 | Kronenberg et al. ................. 310/254 |
| 5,959,378 | * | 9/1999 | Stechmann .......................... 310/49 R |

* cited by examiner

Primary Examiner—Tran Nguyen
(74) Attorney, Agent, or Firm—Martin A. Farber

(57) ABSTRACT

A multipole electric motor having a plurality of pole laminations (8–11) guided from ends of coils (4, 5) to a permanent magnet (13) of a rotor (14), the pole laminations (8–11) are firstly produced as a coherent sheet-metal part, and is partially injection-coated with a plastic. Subsequently, the pole laminations (8–11) are separated from one another by means of a laser beam, for example. This renders the mounting of the pole laminations (8–11) particularly simple.

10 Claims, 4 Drawing Sheets

METHOD FOR PRODUCING A MULTIPOLE ELECTRIC MOTOR, AND A MULTIPOLE ELECTRIC MOTOR

FIELD AND BACKGROUND OF THE INVENTION

The invention relates to a method for producing a multipole electric motor, in which a plurality of pole laminations mutually separated magnetically are arranged between the ends of coils and a rotor, as well as to a multipole electric motor having a rotor and having a plurality of pole laminations, which are mutually separated magnetically and extend from the ends of coils to the rotor.

Such a multipole electric motor and a method for producing it are known in practice. The multipole electric motor has in this case two or more coils as stator and, on the rotor, a cylindrical permanent magnet having a plurality of magnetic poles. One pole lamination is guided in each case from one end of one of the coils to the rotor, where it is situated opposite the permanent magnet with a very slight spacing. In the known method for producing the known electric motor, the pole laminations are individually fastened on the ends of the coils, and the coils are subsequently mounted in the housing of the electric motor.

A disadvantage of the known method is that the positioning of the pole laminations with respect to the rotor proves to be very complicated. Furthermore, even slight deviations of the coils from their prescribed position in the housing lead to a faulty spacing of the pole laminations from the permanent magnet of the rotor. In the most unfavorable case, the pole laminations can touch the permanent magnet and lead to blocking of the rotor.

SUMMARY OF THE INVENTION

It is the object of the invention to develop further the method mentioned at the beginning for producing a multipole electric motor in such a way as to permit a particularly simple mounting of the electric motor and to permit the pole laminations to be positioned particularly accurately with respect to the permanent magnet. Furthermore, the aim is to create a multipole electric motor in which the pole laminations are positioned particularly accurately with respect to the permanent magnet.

The first-named problem is solved according to the invention by virtue of the fact that the pole laminations are produced as a component held together via webs and that the pole laminations are fastened in a middle region on a holding part made from plastic, and the webs are subsequently severed between the individual pole laminations.

The component forming the pole laminations can, for example, be produced particularly accurately from sheet steel by stamping and bending. After the component forming the pole laminations has been fastened on the holding part, the pole laminations are fixed between one another, with the result that they remain in their prescribed position after the webs have been severed. After the mounting of the structural unit comprising the holding part and the pole laminations in the electric motor, the pole laminations are aligned particularly accurately with respect to the permanent magnet of the rotor. A further advantage of this configuration is in that the permanent magnet can be produced to be weaker, and thus in a very cost effective fashion owing to the high accuracy with which the pole laminations are positioned. Thanks to the method according to the invention, it is also no longer necessary for the pole laminations to be individually mounted, as in the case of the known method. As a result, the production of the electric motor proves to be particularly cost-effective. The production of the electric motor using the method according to the invention can, moreover, be automated.

The component forming the pole laminations could, for example, be bonded to the holding part. However, the method according to the invention proves to be particularly cost-effective when the component forming the pole laminations is injection-coated or potted by means of solidifiable plastic, and when the severing of the webs of the pole laminations is performed after the solidification of the plastic. After the injection-coating or potting by means of the plastic, the pole laminations are reliably positioned, with the result that they remain in their prescribed position after the webs have been severed.

In accordance with an advantageous feature of the invention, the webs between the pole laminations can be severed with particularly high accuracy when they are cut through by a laser beam. A further advantage of this method is that the laser beam places no mechanical load on those regions of the pole laminations and the plastic which border the break.

The webs could, for example, be arranged in the region provided for the permanent magnet. The laser beam could then subsequently be used to cut out a circle corresponding to the diameter of the permanent magnet, and thus to sever the webs. As a result, however, the sheet-metal part, and thus the bordering regions of the plastic are subjected to a very high thermal load. In order to cut by means of the laser beam, it is possible in accordance with another advantageous feature of the invention to use a particularly weak laser beam of small diameter when webs arranged in lateral regions next to a cutout for a permanent magnet are severed by means of the laser beam at two points in each case. The weak laser beam of small diameter leads only to a very slight thermal loading on the sheet-metal part. Nevertheless, it is possible hereby to produce large spacings of the pole laminations from one another, as a result of which magnetic induction of two neighboring pole laminations is particularly slight, in addition.

In accordance with another advantageous feature of the invention, the webs between the pole laminations can be severed particularly quickly and simultaneously when they are removed by a punching method. In this case, it is even possible, given an appropriate configuration of the punching tool, for all the webs to be severed simultaneously, and to produce the cutout for the permanent magnet of the rotor in the same work operation. This leads to low production costs, in particular, when the electric motor is to be produced in large batch-quantities using the method according to the invention.

The second named problem, specifically the creation of a multipole electric motor, in which the pole laminations are positioned particularly accurately with respect to the permanent magnet, is solved according to the invention by virtue of the fact that the pole laminations are arranged in a common holding part made from plastic in a region facing the rotor.

This configuration provides the electric motor with a structural unit which comprises the pole laminations and the holding part and can be produced particularly accurately outside the electric motor. Consequently, the individual pole laminations are positioned particularly accurately with respect to the permanent magnet, as a result of which the electric motor according to the invention can have a weaker permanent magnet than in the known electric motor and consumes less electric current. Furthermore, the electric motor according to the invention can be mounted in a particularly cost-effective fashion, since it is necessary to mount only a single component despite a plurality of pole laminations mutually separated magnetically.

The pole laminations could, for example, be made of a sintered material. However, in accordance with an advantageous feature of the invention, the pole laminations can be produced in a particularly cost-effective fashion using the punching method and by bending when they are made of galvanized steel sheet. Furthermore, owing to this configuration, the pole laminations have a particularly high corrosion resistance by comparison with non-galvanized steel sheet.

As further advantage, the costs of producing the electric motor according to the invention are reduced when the holding part is constructed as part of a housing of the electric motor.

In accordance with another advantageous feature of the invention, the rotor is positioned particularly accurately with respect to the pole laminations when the holding part has a bearing block for the rotor and/or for a shaft driven by the rotor.

The electric motor according to the invention can be mounted particularly quickly when the holding part or a housing part of the electric motor has positioning pins, and the respective other component has cutouts for the positioning pins. This mounting can be automated, in addition.

In accordance with another advantageous feature of the invention, the pole laminations are held in the holding part in a self-closed fashion when the pole laminations have cutouts or projections inside the holding part.

BRIEF DESCRIPTION OF THE DRAWINGS

With the above and other objects in view, the present invention will become more clearly understood in connection with the detailed description of preferred embodiments, when considered with the accompanying drawings of which

BRIEF DESCRIPTION OF THE PREFERRED EMBODIMENTS

Figure 1:
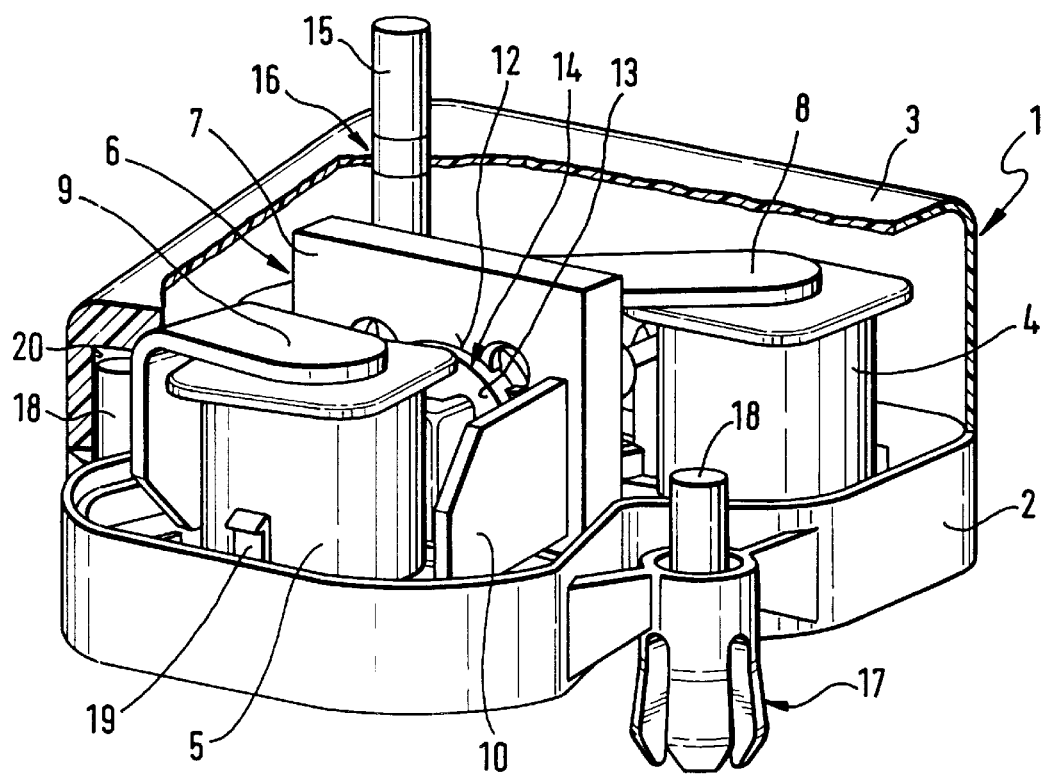
FIG. 1 shows a perspective representation of an electric motor according to the invention.

FIG. 1 shows an electric motor according to the invention having a housing 1 which is assembled from a housing lower part 2 and a housing upper part 3. The housing upper part 3 is represented partially cut away in order to clarify the drawing. Two coils 4, 5 and a structural unit 6 composed of a holding part 7 and a total of four pole laminations 8–11 are arranged in the housing 1. The structural unit 6 composed of the holding part 7 and the pole laminations 8–11 has a cutout 12 for holding a multipole permanent magnet 13 of a rotor 14. The pole laminations 8–11 extend in each case from one end of one of the coils 4, 5 to the permanent magnet 13 of the rotor 14, and are bonded to the ends of the coils 4, 5 in order to simplify mounting. The rotor 14 drives a shaft 15, which is guided vertically through the housing upper part 3, via a worm gear (not represented). The housing upper part 3 has a bearing shell 16 in the region of the shaft 15. Arranged on the underside of the housing lower part 2 is a fastening clip 17 by means of which the electric motor can be mounted on a base plate (not represented). The housing lower part 2 also has guide pins 18 which penetrate cutouts 20 in the housing upper part 3. As a result, the housing lower part 2 and the housing upper part 3 are aligned with respect to one another. Arranged on the housing lower part 2 are latching arms 19 which engage behind a rim (not represented) of the housing upper part 3.

When current pulses are applied alternately to the coils 4, 5, the rotor 14 is rotated in each case by 90° and therefore drives the vertical shaft 15 in a stepwise fashion. For relatively small steps, the electric motor can be provided with three or more coils and a corresponding number of pole laminations. The electric motor is therefore particularly suitable for example for driving a pointer instrument of a motor vehicle.

Figure 2:
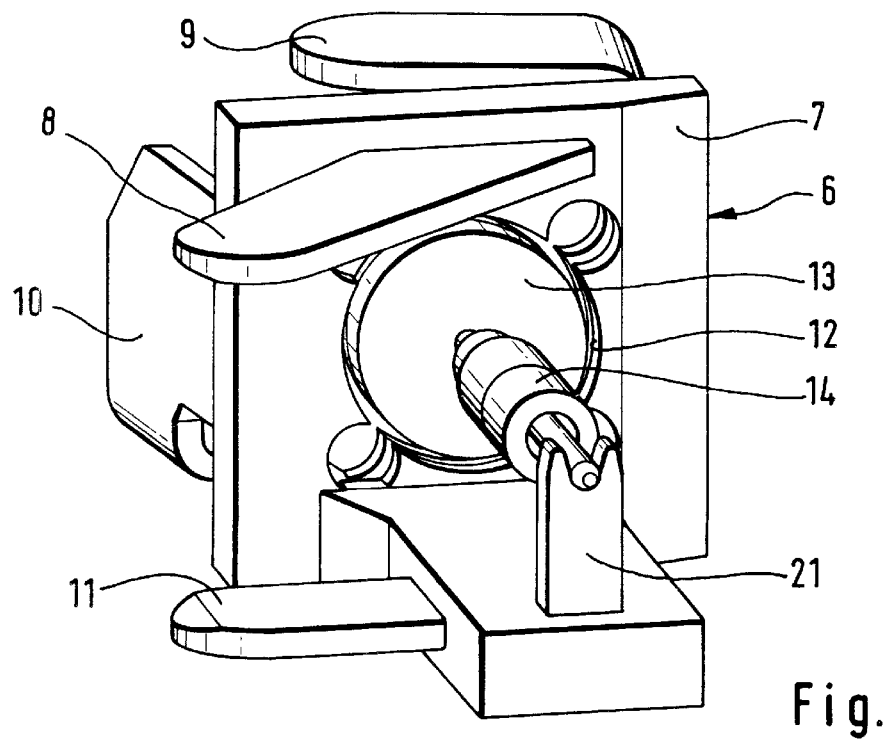
FIG. 2 shows a perspective view from behind of pole laminations fastened in a holding part with a rotor from FIG. 1, FIGS. 3–6 show a cycle for producing a structural unit composed of the pole laminations and the holding part.

FIG. 2 shows, in a perspective view from behind of the structural unit 6 of the holding part 7 and the pole laminations 8–11, that the holding part 7 is produced in one piece with a bearing block 21 of the rotor 14. The holding part 7 is made of plastic and prevents any magnetic induction from one of the pole laminations 8–11 to the neighboring pole laminations 8–11. The bearing block 21 has very large dimensions, with the result that it can form a part of the housing lower part 2. Of course, it is also possible for the holding part 7 to be produced in one piece with the housing lower part 2.

Figure 3:
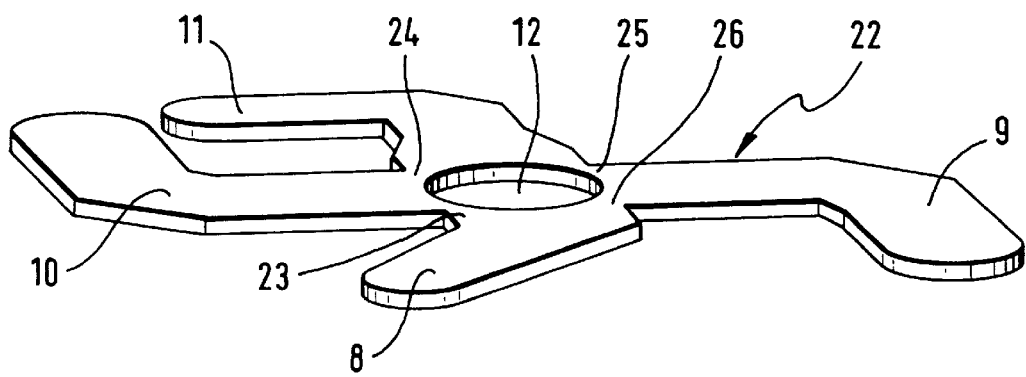
Figure 4:
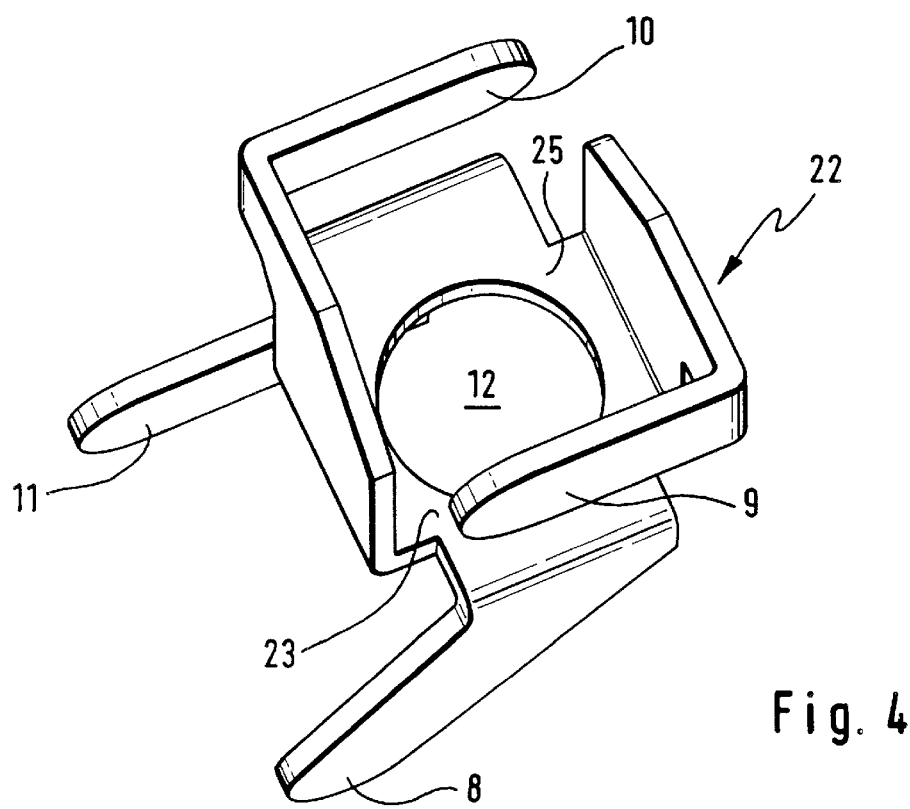
Figure 5:
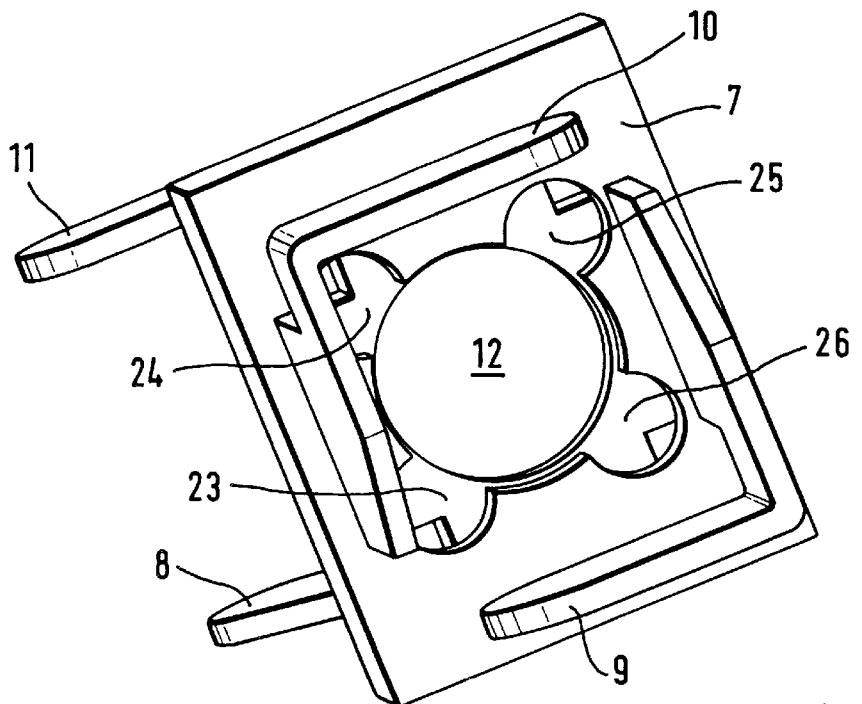

FIGS. 3 to 5 show a cycle for producing the structural unit 6 composed of the pole laminations 8–11 and the holding part 7 made from plastic. A punched sheet-metal part 22 having four pole laminations 8–11 and the round cutout 12 for the permanent magnet 13, represented in FIG. 1, of the rotor 14 is to be seen in FIG. 3. The pole laminations 8–11 are interconnected via webs 23–26 arranged near the cutout 12.

FIG. 4 shows the sheet-metal part 22 from FIG. 3, after the free ends of the pole laminations 8–11 have been bent away. The ends of respectively two mutually opposite pole laminations 8–11 now have a spacing which corresponds to the heights of the coils 4, 5 represented in FIG. 1.

FIG. 5 shows the sheet-metal part 22 from FIG. 4, after the middle regions of the pole laminations 8–11 have been enclosed by plastic. To simplify the drawing, the bearing block 21 from FIG. 2 is not illustrated here. In order to enclose the middle regions of the pole laminations 8–11, the sheet-metal part 22 can, for example, be inserted into an injection mold and be injection-coated with plastic using the injection molding method. As an alternative to this, the sheet-metal part 22 can also be coated at the prescribed points by a plastic which cures chemically. After the curing, the plastic forms the holding part 7 for the pole laminations 8–11, and can be removed from the mold. FIG. 5 also shows that the sheet-metal part 22 is not coated with plastic in the region of the webs 23–26.

Figure 6:
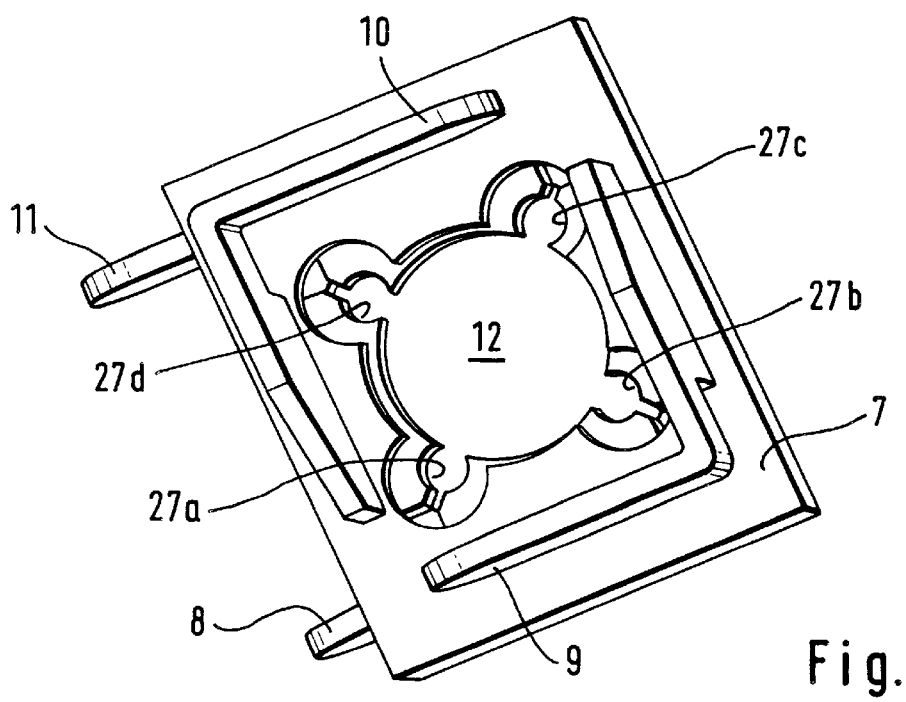

FIG. 6 shows the sheet-metal part 22 with the holding part 7, after the webs 23–26 between the pole laminations 8–11 have been removed using the punching method. Cutouts 27a–27d produced by the punching tool are smaller than that region of the sheet-metal part 22 left free of plastic. As a result, a die of the punching tool can be mounted directly on the sheet-metal part 22. The holding part 7 holds the pole laminations 8–11 in their prescribed position. The structural unit 6 formed by the pole laminations 8–11 and the holding part 7 can subsequently be fastened in the housing 1 represented in FIG. 1.

Figure 7:
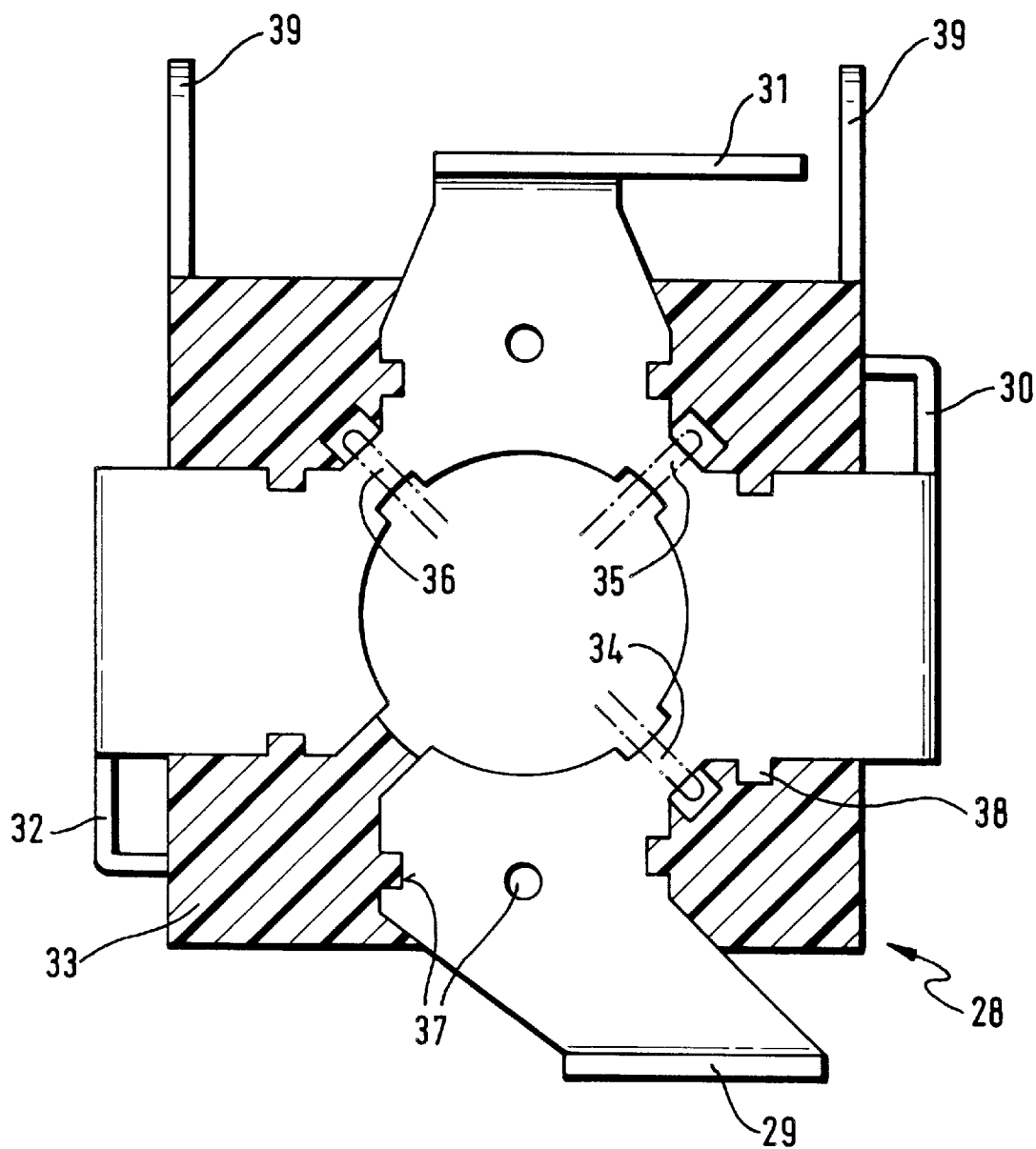
FIG. 7 shows a further embodiment of a structural unit composed of the pole laminations and the holding part.

FIG. 7 shows a further embodiment of a structural unit 28 composed of pole laminations 29–32 and a holding part 33 made from plastic before severing of webs 34–36 between the pole laminations 29–32. To simplify the drawing, the holding part 33 is represented in a cut-open fashion. The pole laminations 29–32 are connected to one another by means of a total of three webs 34–36, so that no web is arranged between the two pole laminations 29, 32. Consequently, one web less needs to be severed by comparison with the embodiment represented in FIG. 5. In this case, a laser beam guided in the shape of a U, for example, is particularly suitable for severing the webs 34–36, and it severs the webs 34–36 at two points in each case. The paths on which the laser beam is to be guided are represented by dots and dashes in the drawing. In the region of the holding part 33, the pole laminations 29–32 have cutouts 37 and projections 38 which are filled with or enclosed by the plastic. As a result, the pole laminations 29–32 are fastened in the holding part 33 in a self-closed fashion. FIG. 7 also shows that the holding part 33 is produced in one piece with fastening and positioning pins 39. These fastening and positioning pins 39 can be used to fasten the structural unit 28 composed of the holding part 33 and the pole laminations 29–32 in the housing 1, represented in FIG. 1 of the electric motor.

What is claimed is:

1. A multipole electric motor comprising;

coils having opposite ends, a rotor, a plurality of pole laminations which extend from said ends of said coils to said rotor, wherein said pole laminations are arranged upon a common holding part located in a region adjacent the rotor, and wherein the pole laminations have cutouts inside the holding part.

2. The multipole electric motor as claimed in claim 1, wherein the pole laminations are made of galvanized steel sheet.

3. The multipole electric motor as claimed in claim 1, wherein the holding part is constructed as part of a housing of the electric motor.

4. The multipole electric motor as claimed in claim 1, wherein the holding part has a bearing block for the rotor.

5. The multipole electric motor as claimed in claim 1, wherein the holding part has positioning pins, and a housing part of the electric motor has cutouts for receiving the positioning pins.

6. The multipole electric motor as claimed in claim 1, wherein a housing part of the electric motor has positioning pins, and the holding part has cutouts for receiving said positioning pins.

7. The multipole electric motor as claimed in claim 1, wherein the pole laminations have projections inside the holding part.

8. The multipole electric motor as claimed in claim 1, wherein the holding part has a bearing block for a shaft driven by the rotor.

9. The multipole electric motor as claimed in claim 1, wherein the holding part has a bearing block for the rotor and for a shaft driven by the rotor.

10. A multipole electric motor comprising;

coils having opposite ends, a rotor, a plurality of pole laminations which extend from said ends of said coils to said rotor, wherein said pole laminations are arranged upon a common holding part located in a region adjacent the rotor, and a permanent magnet located on said rotor, wherein said common holding part has a cutout for receiving the permanent magnet, and wherein the pole laminations are securely held by the holding part and extend from respective ends of the coils to a location adjacent the permanent magnet inside the cutout.

\* \* \* \* \*